United States Patent [19]
Lynch

[11] 3,992,787
[45] Nov. 23, 1976

[54] ASTROLOGICAL COMPARISON APPARATUS AND DAILY ASTROLOGY WHEEL

[76] Inventor: John Patrick Lynch, 1934 Portland Ave., St. Paul, Minn. 55104

[22] Filed: Dec. 15, 1975

[21] Appl. No.: 640,465

[52] U.S. Cl. .................................................. 35/44
[51] Int. Cl.² .......................................... G09B 29/00
[58] Field of Search ......................................... 35/44

[56] References Cited
UNITED STATES PATENTS
573,091  12/1896  Lindahl ................................. 35/44
1,594,675  8/1926  Kuhlman ........................... 35/44 X
3,355,822  12/1967  Losey .................................... 35/44

*Primary Examiner*—William H. Grieb

[57] ABSTRACT

Astrological comparison apparatus having movable indicators and wheels containing astrological data for simple and rapid comparison of the astrological criteria associated with individuals.

8 Claims, 6 Drawing Figures

ASTROLOGICAL COMPARISON APPARATUS AND DAILY ASTROLOGY WHEEL

BACKGROUND OF THE INVENTION

1. Field of the Invention

Comparison devices utilizing moving wheels and indicators to identify and compare astrological parameters and data associated with different individuals.

2. Description of the Prior Art

The astrological sciences, commonly referred to as "astrology", have been known and utilized by man for thousands of years. The science is based upon knowledge of the heavenly bodies and their relative positions at any given time. The various astrological parameters have been identified by various symbols, positions of heavenly bodies and the angular and/or time comparison between the various heavenly bodies. Astrology has provided means for assigning an astrological "identity" to each individual person, based generally upon the position of the various heavenly bodies at the time when the individual was born.

By knowing the astrological identity of an individual, and by having a detailed knowledge of the various astrological parameters, the astrological scientists believe that it is beneficial to the individual to "regulate" his activities by correlating them with various favorable positions of the heavenly bodies, as defined by the astrological parameters. Various tables, charts and treatises have long been available which categorize and tabulate the various astrological parameters. To relate this data to the astrological identity of an individual has required considerable skill. Generally, it has required that the various charts, tables and graphs be consulted by a knowledgeable astrologist and that a "prediction" then be made for the particular individual wherein his favorable times for various activities are specified. In theory, the individual would have a more abundant life by regulating his various activites to correspond with dates and times which are favorable in light of his astrological identify.

An individual desiring to regulate his daily activities through the astrological sciences has long been handicappd through what is frequently a minimal understanding of astrology and an inability to understand and utilize the various astrological tables and charts of data which are available. This problem is compounded when an individual attempts to utilize astrological data to determine whether he and another individual, such as a spouse or business partner, are "compatible" in their proposed dealings. As a result, the generally unskilled person desiring to practice the astrological sciences has been severely limited and has generally been unable to take advantage of the vast amount of astrological data which is available in the relatively complex tabulations and charts.

SUMMARY OF THE INVENTION

Astrological comparison apparatus comprised generally of a base wheel which is concentrically attached to an inner wheel. The front surface of the base wheel is divided into a plurality of arcuate segments. Each of the arcutate segments corresponds to one of the twelve signs of the zodiac. Each segment is divided into smaller arcuate sections. Indecia located within the section and adjacent the individual segments subdivide them by degree measurements corresponding to the 30 days in an astrological month. These markings and indecia form a zodiacal chart, often referred to as a "Zodiac" on the base wheel front surface.

Positioned between the base wheel and the inner wheel is a spoked wheel which is comprised of a hub portion with a plurality of spokes radiating outwardly from the hub. The spokes are intended to overlie a portion of the base wheel front surface. When the spoked wheel is placed in a particular position, each of the spokes is aligned with a particular portion of the Zodiac which is imprinted on the outer portion of the base wheel. It is intended that the spoked wheel be positioned relative to the Zodiac based upon the time and date of birth of the individual using the apparatus.

Positioned adjacent the spoked wheel is an identifying member which may be rotated with a point end overlaying a portion of the Zodiac. The point end of the identifying member is positioned on the portion of the Zodiacal chart which corresponds with the birth date and time for a second individual. By comparing the proximity of the point end of the identifying member with any one of the spoke members on the spoked wheel, the user of the comparison apparatus can determine whether the two individuals who are utilizing the device are compatible.

The inner wheel has imprinted on its outer face a plurality of numerals designating various times of day. Corresponding to each of these numerals is a section of the inner wheel which is identified by various criteria which may be used to describe qualities of life, a person's aspirations, or habits. The inner wheel, the base wheel, the spoked wheel and the identifying member are all attached to one another by means of a connecting pin. Thus, by rotating the inner wheel such that the time of day corresponding to the user's time of birth is positioned in a particular location with regard to the Zodiac imprinted on the base wheel, it may be determined which of the user's qualities of life or aspirations are "favorable" and which are not "favorable" at any particular time. This then would allow the user to "regulate" his activities to correspond with favorable time periods.

The invention may be manufactured in two versions, one corresponding to the astrological parameters of a women and one corresponding to those of a man. By using the wheel, a person may determine both whether he is compatible with any particular individual and also whether particular qualities of life and aspirations are in a favorable position on any particular day. The device may be carried on a chain or similar device and utilized as a piece of jewelry to be worn around a person's neck.

DESCRIPTION OF THE PREFERRED EMBODIMENT

Figure 1:
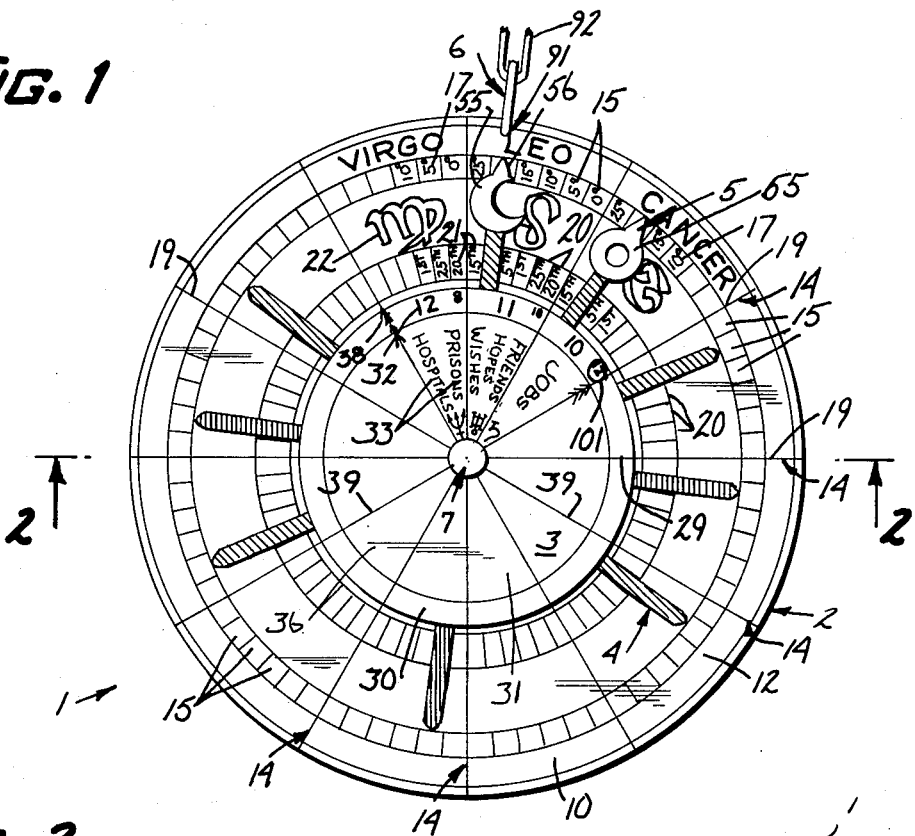
FIG. 1 is a top plan view of the astrological apparatus as it would be designed for a male user.

Referring to FIGs. 1–6, wherein like numerals refer to like structural elements, the present invention is an astrological comparison apparatus or comparator, designated by the numeral 1. The comparator comprises a base wheel 2 to which is concentrically attached to an inner wheel 3. Positioned between base wheel 2 and inner wheel 3 is a spoked wheel 4 containing a plurality of outwardly extending spokes 42–49. Positioned between spoked wheel 4 and inner wheel 3 is an elongated identifying member 5. Base wheel 2, identifying member 5 and inner wheel 3 are connected at a common pivot point by means of a connecting hub 7 which allows the connected members to be rotated with respect to one another. Various symbols and indecia corresponding to astrological elements are imprinted on the front surfaces of base wheel 2 and inner wheel 3 in a manner which will be described in detail later. An attachment member 6 may be attached between base wheel 2 and a support chain 92 for purposes of hanging or displaying comparator 1 as a piece of jewelry.

Before describing the detailed features of comparator 1, a brief description of the nature of astrology and the manner in which it may be utilized will be helpful in understanding the function and operation of the present invention. Astrology may be broadly defined as a study of the planetary bodies and their inter relationship with one another as they relate to the behavior of man. The basic tool of astrology is the Zodiacal chart or the Zodiac. As is well known in the art of astrology, the Zodiac comprises twelve segments arranged along the circumference of a circular arc. There being 360 degrees in the circular arc, each of the segments subtends 30 degrees of the circular arc. In one sense, the Zodiac may be thought of as a top view of the earth solar system with the sun at the center. The various planets and heavenly bodies which are positioned around the sun would occupy various segments of the circular arc which surrounds the sun. Thus, the various positions of the heavenly bodies as they move about the sun and in relation to the sun may have their positions described by placing them in a particular segment of the Zodiac. A similar positioning of the heavenly bodies may be accomplished if the solar system is thought of as having the earth at its center with the sun, the moon's earth and the other heavenly bodies positioned about the earth, with each heavenly body occupying a segment of the circular arc surrounding the earth. It is this latter embodiment of the Zodiac which is utilized in the perferred embodiment of the present invention, i.e. a Zodiac having the earth at the center with the sun, moon and planets occupying portions of the circular arc surrounding the earth.

Because the sun may be thought of as revolving around the earth in that in any one-year period it will occupy every angular position in a complete circle surrounding the earth, the sun "follows" a path or orbit about the earth which encompasses a complete circular arc of 360 degrees. This circular arc may be divided into twelve equal segments each subtending an arc of 30 degrees. In the science of astrology, the position of the sun or any other heavenly body with respect to the earth may be described by specifying which portion of the circular arc, i.e. which of the twelve sections, the planet is located in at a particular point in time. To particularly identify the location of the heavenly bodies, the twelve sections or "houses" which comprise the circular arc surrounding the earth have been assigned names. These names are: Gemeni, Taurus, Aries, Pisces, Aquarius, Capricorn, Sagitiarius, Scorpio, Libra, Virgo, Leo and Cancer. In addition, a Greek letter or symbol has been equated with each of these house designations, as is well known in astrology. When it is desired to specify the location of any heavenly body with respect to the earth, this may be accomplished by stating that the heavenly body is in the sign of one of the houses, i.e. is in the house of Taurus. We then know that the heavenly body is located in that 30-degree section of the circular arc surrounding the earth which is designated "Taurus".

To further pinpoint the location of any heavenly body, the individual segments of the 30 degree arc surrounding the earth which may be broken down into smaller sections, each representing an equal arcuate distance. Thus, there may be at least 30 separate sections in each house segment, each section representing 1 degree of the 30degrees which is the angular displacement subtended by the associated segment. Thus, it is possible to more accurately identify the arcuate location of a heavenly body by stating that it is in the house of Taurus and that its position within Taurus is at 20 degrees which would be an angular distance of 20 degrees measured from a radial line extending outwardly from the earth which forms the boundary of the Taurus house. This identification would be similar for each of the houses of the Zodiac. In summary, the 360 degree circular arc which surrounds the earth may be thought of as being made up of 12 segments, each segment subtending an arcuate length of 30 degrees and representing one of 12 houses of the Zodiac. The segments in turn may be thought of comprised of 30 equal sections, each section having an arcuate length which subtends 1 degree of the section. This circular chart is called a Zodiac.

Having provided a means for identifying the location of the various heavenly bodies at any particular time, the science of astrology has provided means for relating the position of the various heavenly bodies to one another and to any position on earth for any particular time. The basic precepts of the science of astrology is that the individuality and personality of each human being is influenced by forces which act upon each human being by the various heavenly bodies. For purposes of discussion, these forces may be thought of in a realistic sense as magnetic or gravitational forces exerted by the heavenly bodies on the various cells and magnetic characteristics of the human body. The individuality and personality of an individual are thought of in the science of astrology as being "set" at the time of birth of the individual. Thus, the force which the various heavenly bodies exert upon an individual will depend on the position of each of the heavenly bodies at the time the individual was born. The basic element of astrology is the position of the sun on the Zodiac when an individual is born. For instance, since the sun travels throughout the complete circular arc of the Zodiac in a one-year period, on any one day of birth the sun will be located in a particular portion of that circular arc which may in turn be defined by the name of the house in which the sun is located at that point. As a result, each individual may be said to be born under a particular sign or in a particular house, depending upon the position of the sun when he is born. This is the individual's "sign". The science of astrology dictates that certain heavenly bodies "rule" certain of the signs. In addition, depending upon the position of the heavenly bodies at the time of birth, certain of the heavenly bodies may be deemed to be "strong" and certain may be deemed to be "weak". This will depend upon how the heavenly bodies "harmonize" with the sign of birth.

It is the belief of astrological scientists that since the position of the planets establish certain magnetic currents within the body of a person when he is born, those forces within the human body are influenced thoughout the life of the individual by the position of the various heavenly bodies. Thus, when the heavenly bodies are in a particular position, their influence on the individual may be "positive" wherein the activities of the individual at that point in time will benefit him or they may be "negative" wherein the activities of the individual at that particular time would hinder the individual. As a result, by studying the particular positions of the various heavenly bodies at any particular point in time, it can be predicted through astrological tables and charts whether an individual will be in a "favorable" or "unfavorable" position at that time and therefore whether he should undertake particular activies at that time. Further, it is the belief of astrological scientists that the compatibility of various individuals in various areas of endeavor, e.g. love or business, is influenced by the comparative strength of the heavenly bodies as they act upon the two individuals. For this reason, by knowing the birth date of each of the individuals, the elements of the Zodiac and position of the heavenly bodies may be identified to determine whether those two individuals are compatible. It is this comparison between the astrological elements of two individuals for purposes of determining compatibility which is the object of the present invention. It is a second object of the present invention to determine whether various life factors for that individual are in a "positive" or "negative" position at any particular time. In the past, the determination of these two types of factors has been accomplished only by the use of complex tables, which are generally utilized only by skilled persons. It is believed that the present invention allows for this comparison and for this determination through the use of a relatively simple astrological comparator.

The influence of the heavenly bodies on a male are dictated by the position of the moon at the date and time of his birth. Influence of the heavenly bodies on a female are dictated by the position of the sun at the date of her birth. Because of this distinction between the heavenly bodies which influence males and females, the present invention may be manufactured in one of two types of embodiments, one designed for use by a male and one designed for use by a female. The embodiment for use by a male will be described first and is depicted in FIG. 1. Base wheel 2 of comparator 1 has a generally circular planform with a front surface 10 and a back surface 11. Front surface 10 is divided into two portions, an outer annular portion 12 and an inner circular portion 13. Inner circular portion 13 is generally covered by inner wheel 3 which overlays it. Outer portion 12 is exposed beyond the periphery of inner wheel 3.

Outer surface portion 12 includes a design of a Zodiac chart. This chart may be inlaid by etching the outer surface 12, by painting the surface or by other suitable means. To form the Zodiac chart, outer surface 12 is divided into 12 equal segments, each designated by the numeral 14. Each of segments 14 subtends an arc of 30 degrees. Segments 14 may contain first indecia or printed matter which identifies the particular segment with one of the houses of the Zodiac, e.g. the houses of Virgo, Leo and Cancer shown in FIG. 1. These houses may be designated both by the English-language name of the house or by the astrological symbol which represents that house such as the symbols designated by the numeral 22 in FIG. 1.

Included within each of segments 14 are a plurality of sections, each designated by the numeral 15. In the preferred embodiment shown in FIG. 1, each of sections 15 represents an equal annular displacement of 5 degrees. Thus, six sections fill the 30 degree annular displacement of each segment. Second indecia, designated by the numeral 17, serve to identify the angular displacement of each of sections 15 relative to a radial line 19 which forms one boundary of the segment 14.

Also included within each of segments 14 is a plurality of inner sections, each designated by the numeral 20. In the preferred embodiment shown in FIG. 1, each of inner section 20 is identified by one of a plurality of indecia 21 which represents a day of a month. Since each segment subtends a angle of 30 degrees, if each of inner sections 20 represented in angular displacement of 1 degree, it would also represent one day of a 30-day month. In the astrological sciences, 1 degree is often thought of as one day. Located at the center of base wheel 2 is a shaft opening 17 through which a connecting pin 7 may be inserted for a purpose which will be described in detail later.

Figure 4:
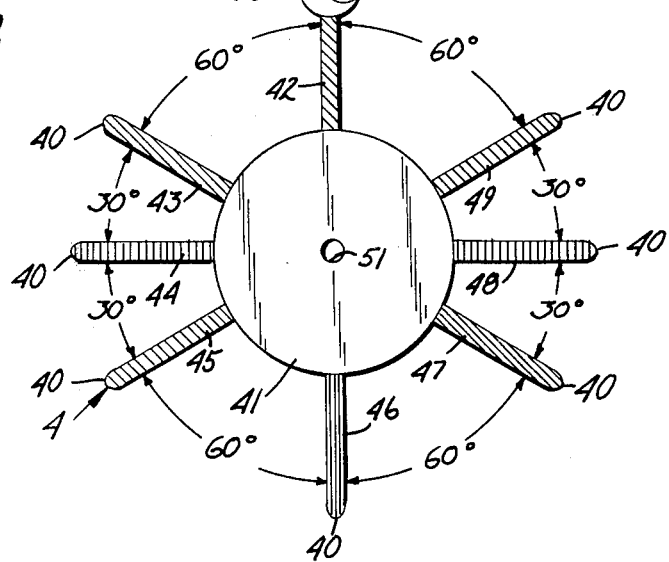
FIG. 4 shows a top plan view of a spoked wheel which would be utilized in an embodiment for a male.

Positioned between base wheel 2 and inner wheel 3 is a spoken wheel 4. As is shown in FIG. 4, spoked wheel 4 comprises a hub portion 41 which has a shaft opening 51. In the preferred embodiment, hub portion 41 is generally circular in planform. Radiating outwardly from hub portion 41a are a plurality of spoke member 42–49, each being slender with opposed ends and side edges. Spoke 42 is designated a "positioning spoke member" and its function will be described subsequently. Spoked wheel 4 is sized such that hub portion 41 does not overlay the printed matter on the outer surface 12 of base wheel 2. Each of spoked members 43–49 has a point end 40 which extends into the outer annular portion 12 of the base wheel front surface. This allows the spokes 43–49 to each be positioned adjacent an angular section 15 or an inner section 20 for purposes which will be described in detail later.

It is the purpose of spokes 42–49 to have a particular spacial relationship relative to one another so that they overly opposed and adjacent portions of the Zodiac chart contained on the outer surface 12 of base wheel 2. For the desired purposes, the spoked members 43–49 should be spaced apart from one another and from positioning spoke member 42 a specific angular distance. Positioning spoke member 42 is particularly identified and differentiated from the other spoke members. Member 42 is intended to be positioned adjacent the zodiac chart section 15 which corresponds to the time of birth of the individual using the comparator 1. This positioning process will be described in detail later. To differentiate positioning spoke member 42 from spoke members 43–49, a moon insignia 55 is attached to it for embodiments utilized by males and a sun insignia 55a is attached for embodiments utilized by females. Either insignia 55 or 55a carry a point element 56 radially aligned with the center of hub 41–41a. Other means of differentiation (not shown) may also be utilized. The position of spoke members 42–49 may be specified as follows. Each of spoke members 42–49 is defined in part by a center line down its center to the center of hub 41. Spoke members 43, 44, 45, 46, 47, 48 and 49 are positioned radially from the centerline of positioning spoke member 42 an angular distance of 60 degrees, 30 degrees, 30 degrees, 60 degrees, 60 degrees, 30 degrees, and 30 degrees, respectively. These 8 spokes represent the 8 major aspects of astrology. Further, the various spoke members are color coded as follows. Positioning spoke 42 and spokes 43, 45, 47, and 49 each have one color. Spokes 44, 46 and 48 have a second color. This allows the spokes to be divided into two separate plurality of spokes, each plurality having spokes of one color.

Figure 3:
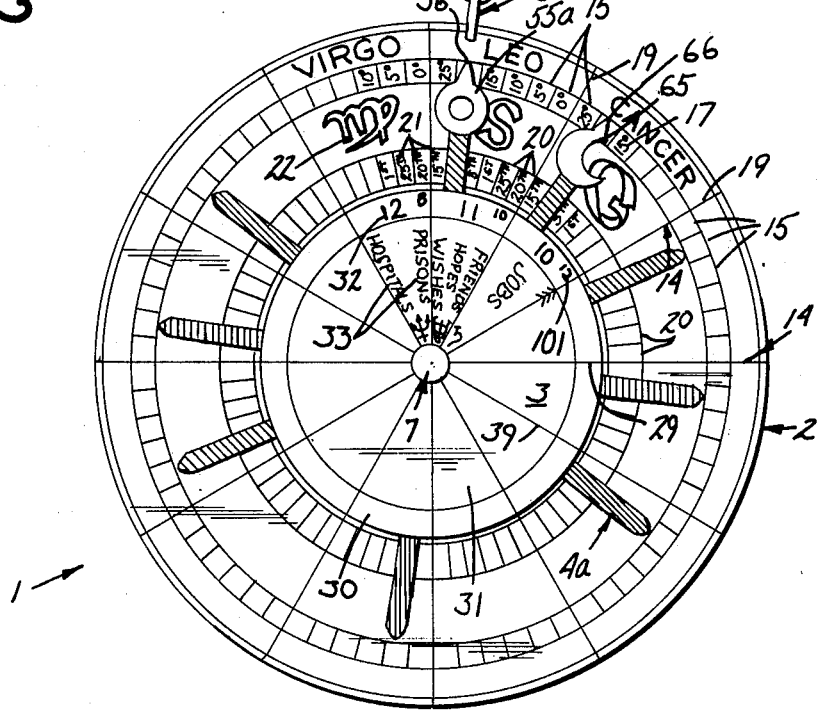
FIG. 3 is a top plan view of the astrological comparison apparatus showing an embdiment which would be utilized by a female.
Figure 5:
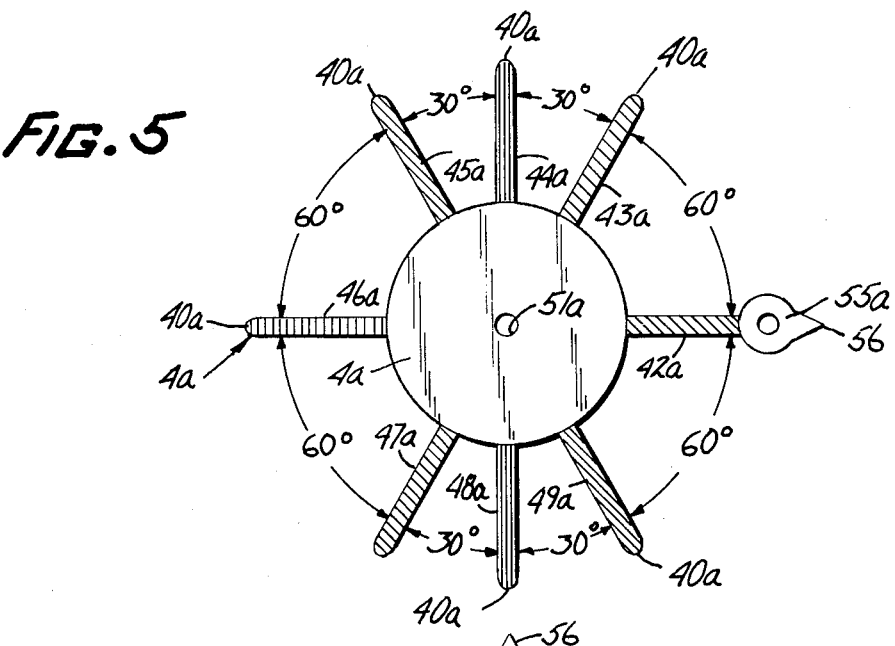
FIG. 5 shows a top plan view of a spoked wheel which would be utilized in an embodiment for a female.

The spoked wheel 40 is to be utilized on a comparator 1 which is used by a male. When comparator 1 is to be utilized by a female, the embodiment shown in FIG. 3 is to be utilized which differs from the embodiment shown in FIG. 1 in the design of a spoked wheel 4a. In this embodiment, the spoked members 42a–49a have the same angular relationship to one another and to positioning spoke member 42a as was described previously for spoked wheel 4. In this embodiment, positioning spoke member 42a is identified by a circular sun symbol 50a which is attached to the end of the positioning spoke member. The same differentiation in color between the various spokes of spoked wheel 4a is utilized as was utilized for spoked wheel 4. Elsewhere in the specification, spokes 43, 44, 45, 46, 47, 48 and 49 (or 43a–49a) are referred to as the first, second, third, fourth, fifth, sixth and seventh spokes, respectively.

A shaft opening 51 (or 51a) in the center of the spoked wheel is utilized to concentrically attach spoked wheel 4 (or 4a) to base member 2. It is intended that spoked wheel 4 (or 4a) be positioned with respect to base member 2 in a manner which will be described in detail later. For this purpose, securing means may be utilized such as a securing area 8 located beneath positioning spoke member 42 (or 42a) may be covered with an adhesive 80 for purposes of retaining the spoked wheel in a preselected position. Other retention means (not shown) may also be utilized when appropriate, or positioning spoke member 42 may be held in any selected position merely by frictional forces or adjoining members.

Figure 6:
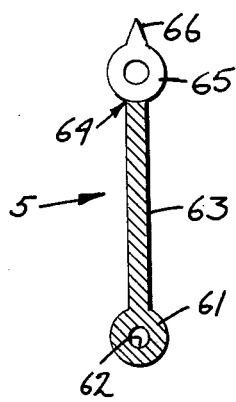
FIG. 6 is a top plan view showing an identifying member.

Positioned between spoked wheel 4 (or 4a) and inner wheel 3 is an elongated identifying member 5 (see FIG. 6). In the preferred embodiment, identifying member 5 has a central elongated spoke portion 63, a hub portion 61 which contains a connecting pin opening 62 and a point end 64. In the embodiment which is to be utilized by a male with a moon symbol on spoke 42, the point end 64 may be capped by a sun symbol element 65 (see FIG. 6) or in the embodiment which is to be utilized by a female the point end may be capped by a moon symbol element. The sun or moon element have a point element 66. It is the function of point element 66 to extend outwardly from the periphery of inner wheel 3 to overlay a position on the outer surface portion 12 of base wheel 2 generally adjacent a pre-selected angular section 15. This function will be described in detail later. It is intended that identifying member 5 be movable with respect to base wheel 2.

While the two preferred embodiments described herein are for use with two persons of opposite sex, the invention may be embodied in devices for use by persons of the same sex. The designating point elements (e.g. sun and moon) and the positioning of the spoked wheels and identifying members would then be based on the astrology of the sexes involved.

Inner wheel 3 has a generally circular planform with a front surface 36 and a back surface 37. This front surface 36 has a generally circular inner portion 31 and an adjoining annular outer portion 30. Inner and outer portions 31 and 30 are divided into 12 equal sections by means of radial lines 39. Thus, each section subtends an angle of 30 degrees. The outer portion 30 of each of sections 29 will contain indecia, each designated by the numeral 101, indicating two hours of time in the day, one being A.M. and one being P.M. Thus, the outer portion of surface 36 will contain numeral indecia 101 representing the 24 hours in a day. Also included are indecia 32 which are the numbers identifying each of the 12 houses. The inner portion 31 of each of sections 29 will contain words or phraseology 33 indicating the qualitites of life and aspirations with which that portion of the chart is associated. It is well known in astrology that corresponding to certain houses of the Zodiac are certain factors which are influenced by those houses. For example, the phraseology 33 may refer to the factors shown in FIG. 1, e.g. friends, hopes, wishes, job, legal matters, and travel matters. Other elements which may be indicated would be partners, marriages, money, death, home, short journeys, gambling and love. As is well taught in the science of astrology, other qualities of life and aspirations may be included in these sections in the manner dictated by astrology. Also indicated in each house may be the ruling planet of that house. Contained in the center of inner wheel 3 is a connecting pin opening 35 which may be utilized for concentrically locating inner wheel 3 with respect to spoked wheel 4 and base wheel 2 to allow inner wheel 3 to be rotated with respect to these other members.

Base wheel 2, inner wheel 3, spoked wheel 4 and identifying member 5 are attached to one another by connecting means including a connecting hub 7. As is shown in detail in FIG. 2, connecting hub 7 comprises a connecting pin 70 which may be inserted through openings in the various members and which is bounded on one end by a first connecting member 71 and on the other end by a second connecting member 72. A threaded bolt, rivet or similar connecting hub 7 may be utilized where appropriate.

Figure 2:
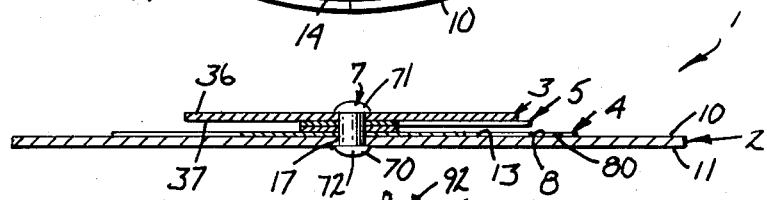
FIG. 2 is an edge sectional view taken along the line 2—2 in FIG. 1.

It is intended that the preferred embodiment of the present invention be utilized as a piece of jewelry. For this purpose, it may be manufactured from a metal substance, from plastic or other appropriate materials. The various indecia on inner wheel 3 and base wheel 2 may be affixed by engraving the surfaces of the wheels, by painting on the wheels or by other suitable methods. The comparator 1 may be hung from a support chain 92 or leather strap (not shown) utilizing an attachment member 6. Attachment member 6 may be attached to an S-shaped hook or link in support chain 92 and may be threaded through an attachment member opening 90 located in the outer edge of base wheel 2. In the preferred embodiment, the location of attachment member 6 will define an attachment member position 91 which is intended to correspond with a point on the Zodiac chart which correspond to the birth time and place of the person utilizing the comparator 1. This particular position on the Zodiac chart is selected by use of various tables as will be described in detail later. Typically, a person well schooled in the astrological sciences will make this determinaton for the user of this apparatus. After this position has been selected, the attachment member position 91 is located at this point and the positioning spoke member 42 (or 42a) of spoked wheel 4 (or 4a) is positioned at this location. Spoked wheel 4 (or 4a) may then be fixedly attached to base wheel 2 by means of adhesive 80 as is shown in FIG. 2 or may be maintained in the selected position merely by frictional force of adjacent parts. Other means (not shown) of attaching spoked wheel 4 (or 4a) to base wheel 2 (or 2a) may be utilized where appropriate.

OPERATION OF INVENTION

The operation of the present invention dictates the use and positioning of various elements of the invention. Generally speaking, the present invention has two broad functions. The first is to allow comparison between the astrological elements, e.g. position of various planets between two individuals. The second function may generally be described as determining for the one individual for which the apparatus is designed whether he is in a favorable or unfavorable time frame for performing various functions or for dealing with various qualities of life, e.g. health, love, gambling, marriage and other features well known in the astrological science.

Referring first to the function of comparing astrological elements of two individuals, if the present invention is designed for use by a male, the embodiment shown in FIG. 1 is utilized. In this embodiment, the positioning spoke member 42, having a moon element 55 attached, is fixedly positioned on base wheel 2 with the point end of the positioning spoke located adjacent the section and segment of the Zodiac chart on outer surface 12 which corresponds with the birth time and place of the individual. This position for the positioning member 42 is determined by using an Ephemeris which is well known in the art. An Ephemeris is printed for each year designating the date of each month of the year. The year, date and month would correspond to the birth date of the individual for which the comparator 1 is designed. The Ephemeris would specify an angular position and the planetary sign for that time of birth of the individual. The Ephemeris would present this information based upon Greenwich Mean Time or London Time. Since the moon moves 12½ degrees a day, it is important that variations for the time on the face of the earth correspond to Greenwich Mean Time be made for the time of birth. Thus, one degree should be added to the angular value found in the Ephemeris for every 2 hours from Greenwich Mean Time which the local time of birth varies. This may be calculated by using the facts that noon Greenwich Mean Time corresponds to 7 A.M. Eastern Time, 6 A.M. Central Time, 5 A.M. Mountain Time and 4 A.M. Pacific Time. If a person were born at 10 A.M. Central Time, there would be a two hour difference from noon Greenwich Time and therefore a one degree addition should be made to the angular value found in the Ephemeris.

With this information designating the angular position with each segment of the Zodiac chart and with the sign specified, the point end of the positioning spoke member 42 is positioned corresponding to this angle and sign position on the Zodiac chart imprinted on the outer surface 12 of base wheel 2. The spoked wheel is then set in this position. In the case of an embodiment which is designed for a woman's use, e.g. that shown in FIG. 3, the angular measurement and the astrological sign are also determined using the Ephemeris as was described above. However, since the sun moves only 1 degree per day, there is only a minimal requirement that any correction to the Greenwich Mean Time presented in the Ephemeris be made. Thus, no angular addition to that angular position need be made for time variations from Greenwich Time.

Having "set" the comparator 1 for the particular time of birth of the individual, male or female, using the comparator, the next step is to make selected movements of the identifying member 5. In the case of a comparator 1 being designed for use by a male, the identifying member 5 will have a sun element 65 at its point end 64. In embodiments of comparator 1a for use by a women, the point end 64 of identifying member 5 will contain a moon shaped element. Whether the comparator is designed for a male or female, the movement of identifying member 5 will be the same.

For purposes of comparing the astrological elements of two individuals, e.g. that of a man and a women, the astrological sign and angle for the person who is being compared to the individual for whom the comparator 1 has been designed is determined using an Ephemeris. This is done in the same manner as was described previously. The point end of identifying member 5 is then moved to the position of this angle and astrological sign on the Zodiac chart of outer surface 12. The distance between identifying member 5 and any of spokes 42–49 (or 42a–49a) is then measured using the inner sections 20 on the outer surface 12. If identifying member 5 is within 12 days or degrees (e.g. the indecia 21 associated with inner sections 20), on either side of any one of elements 42, 43, 45, 47 or 49 (or 43a, 45a, 47a or 49a), there is compatibility between the two persons utilizing the comparator 1. If, on the other hand, identifying member 5 is positioned within 12 days or degrees of any one of spoke members 44, 46, or 48 (or 44a, 46a or 48a), there is not compatibility between the two persons. If the identifying member 5 is positioned at any position not covered by these two situations, there is not compatibility between the two individuals. When the individual for whom the comparator 1 has been designed wishes to make a compatibility comparison between another individual, he merely resets the position of identifying member 5 to correspond with the Ephemeris-specified angle and astrological sign of that individual in the manner described earlier.

To utilize comparator 1 in the second manner, i.e. to determine the favorable life or human factors of the individual at any particular day, e.g. friends, hopes, wishes, jobs, money, death, health, home, the inner wheel 3 is rotated. The position that inner wheel 3 is moved to after rotation is dictated by the time of birth of the individual utilizing the apparatus. To find this particular position, the numeric indecia 101 on the outer portion of inner wheel 3 are utilized. Indecia 101 represent the 24 hours in the day, 12 hours being "A.M." and 12 hours being "P.M.". The time of day, in Greenwich England Time, is determined for the person utilizing the apparatus. This time is noted in the indecia 101. For instance, the segment of outer portion 32 corresponding to 6 A.M. for a person who was born at 6 A.M. Greenwich Mean Time may be selected. After this selection is made, inner wheel 3 is rotated until the portion of outer section 32 corresponding to this selected time of birth for the user is alligned adjacent the date of birth for the user of the apparatus. This date of birth is shown by indecia 21 in section 20 of outer wheel 2. Thus, if the user of the apparatus was born in the month of May and this corresponds to the house of Taurus, the indecia 101 of inner wheel 3 corresponding to the user's time of birth is moved adjacent his birth sign, e.g. Taurus, and the particular date in that sign, i.e. the date indicated by indecia 21, which represent his date of birth. The inner wheel is then left positioned in this selected location.

Having set the inner wheel for time and date of birth of the individual using the apparatus, not is then made of the position of the arrow markings designated by the numeral 38 on inner wheel 3 (see FIGS. 1 and 2). These four arrows are adjacent house number 1 which is designated by indecia 32 on inner wheel 3. The area located opposite house number 1 on outer wheel 2 is then known as the "ascendant" house for the individual using the apparatus. The identification of the user's ascendant house has astrological significance and is a task which is frequently performed by astrologists for a substantial monetary fee.

Having located the ascendant house of the user of the apparatus, the spoked wheel 5 is then rotated until the spoked member 42 is positioned at the angular position of the moon for that particular day. The angular position of the moon for that particular day is determined using an ephemeris for the person using the apparatus. This will place the moon in a particular house on outer wheel 4 and will locate it at a particular angular position in that house.

Having set the member 42 at this position, the apparatus is now in suitable arrangement for use as a daily indicator of life functions. For this purpose, the word designations denoted by the numeral 33 on the inner wheel 3 (see FIG. 1) are utilized. Those "human factors" designated by the words 33 which are adjacent spokes numbers 42, 43, 45, 47 or 49 are favorable life signs for that particular day. Those human factors which are located adjacent spokes 44, 46 or 48 are in an unfavorable position and those human factors will not be favorable for the individual on that particular day. Thus, be selecting the proper position for inner wheel 3 which is based upon the particular day the wheel is utilized and the time of birth of the user of the apparatus, the user of the apparatus may determine whether certain life functions are in a favorable or unfavorable position for that particular day. For instance, qualities of home life, marriage and occupation may be favorable for a particular day whereas such things as health, journeys and gambling may be in an unfavorable position for that day.

As the hours of the day pass, the apparatus is again selected utilizing the position of the moon for that time of day, which is determined using the Ephemeris. Since the moon moves 12½ degrees per day, the moon symbol on wheel 4 will be advanced a particular number of degrees as the days pass, utilizing the Ephemeris. The same apparatus may be utilized by a women wherein the symbol on wheel 4 will be a sun rather than a moon, as was described earlier.

METHOD OF DETERMINING ASTROLOGICAL CHARACTERISTICS

In conjunction with the Applicant's apparatus, he has also determined a method for easily determining the astrological factors surrounding his daily functions. To accomplish this method, the Applicant has positioned in the outer section of a circular wheel 12 equal arcuate segments, each designated by the house of the Zodiac. Each of the segments is then subdivided into 5 angular arcs representing 6 degrees of arcuate length. The inner portion of the outer area is divided into equal arcuate segments each representing 1 day of a 30-day calendar month.

A smaller wheel is then impregnated with various indecia. Included in the inner wheel on the outer rim are indecia representing the 12 houses of the Zodiac and indecia representing the times of day, i.e. 12 hours A.M. and 12 hours P.M. The 12 houses are each an angular segment with 30 degrees of arc. It is then necessary to impregnate on the inner portion of the inner wheel within the 12 angular sections, life factors or functions which are well known in the astrological sciences. Located in the section of house 1 is the word personality; in the section of house number 2 is the word money; in the section of house number 3 are the words news, travel, short journeys; in the section of house 4 is the word home; in the section of house 5 are the words children, love and gambling; in the section of house 6 is the word health; in the section of house 7 are the words partners and marriages; in the section of house 8 are the words other persons, money, death and sex; in the section of house 9 are the words legal, courts and long journeys; in the section of house 10 is the word jobs, in the section of house 11 are the words friends, hopes and wishes; in the section of house 12 are the words prisons and hospitals. Also included in each of the house sections on the inner wheel may be the signs of the Zodiac. Similarly, included in the segments of the outer wheel may be the written designation of the houses, their well known astrological symbol or other identifying features. A spoked wheel as was described earlier and an elongated identifying member are positioned between the inner and outer wheels.

The astrological factors are then determined in the method described in the earlier part of this application wherein a positioning spoke of the spoked wheel is positioned at a particular location on the outer portion of the outer wheel. The identifying member is then positioned with its point lying at a selected position on the outer wheel. These positions are chosen as was described earlier using an Ephemeris and knowing the user's time of birth. Whether the persons utilizing the apparatus are compatible or incompatible is then determined by determining which of the color coded spokes of the spoked wheel are positioned over which portions of the outer wheel. This apparatus may be utilized for determing daily favorable signs of an individual in the method described earlier. This includes the rotation of the inner wheel to a position dictated by the Ephemeris values for the person utilizing the apparatus. A comparison is then made after the inner wheel has been positioned between the various sections of the inner wheel and outer wheel to determine favorable characteristics for that individual as was described earlier.

What is claimed is:

1. Astrological comparison apparatus for comparing the astrological characteristics for various individuals, comprising:
   a. a base wheel having generally circular opposed front and back surfaces, said front surface having an annular outer portion and a generally circular inner portion concentric with said outer portion;
   b. a generally circular inner wheel having opposed front and back surfaces, said inner wheel being generally sized to overlay only the inner portion of said base wheel front surface;

c. a spoked wheel including a hub portion and a first and second plurality of spoke members, said spoke members each radiating outwardly from a generally common center located in the hub portion, said spoked wheel also including a positioning spoke member extending outwardly from the hub portion and having a point end, said first plurality of spoke members and said positioning spoke member containing visual differentiating means to differentiate them in appearance from said second plurality of spoke members;

d. an identifying member having a hub end and a point end, said identifying member being selectively movable over the front surface of said base wheel to overlay the point end on a selected point on the outer portion of said base wheel; and e. connecting means for interconnecting the center portion of said base wheel, said inner wheel, said identifying wheel and said identifying member hub end to one another in generally face-to-face concentric relationship to allow each to be selectively rotated with respect to one another.

2. The comparison apparatus of claim 1 wherein:

a. the front surface outer portion of said base wheel contains markings defining twelve arcuate segments having edges defined by radial lines of said front surface, and each of said segments subtending generally equal radial arcs around the periphery of said base wheel, each of said segments containing first indecia identifying one of twelve astrological signs; and b. each of said arcuate segments containing a plurality of arcuate sections, each of said sections subtending equal radial arcs across the arcuate width of said segment, there being associated with said plurality of sections a second plurality of indecia identifying the angular spacing of each of said sections relative to the radial edges of the arcuate segment in which it is contained and corresponding to portions of a calendar month.

3. The comparison apparatus of claim 2, including securing means for selectively securing said identifying wheel to said base wheel with the point end of said positioning spoke member located adjacent a selected one of said sections whose corresponding indecia may correspond to the favorable astrological position dictated astrologically by a person's time of birth.

4. The comparison apparatus of claim 3 wherein the front face of said inner wheel contains an annular outer portion and a generally circular inner portion concentric with said outer portion, said outer and inner portions each being divided into twelve arcuate segments, the inner portion segments and the outer portion segments being adjacent one another, said outer portion segments containing a third plurality of indecia representing times of day which may correspond to a person's astrological time of birth, and said inner portion segments containing identifying phraseology.

5. The comparison apparatus of claim 3 including attachment means positioned at a discrete location on the outer front face portion of said base member to attach said base member to a support strand for carrying the comparison apparatus thereby, the discrete location of said attachment means being located generally adjacent the selectively positioned point end of said spoked wheel positioning spoke.

6. The comparison apparatus of claim 3 including a carrying strand attached to said attachment means for supporting said base wheel thereon.

7. The comparison apparatus of claim 1 wherein said connecting means include each of said base wheel, inner wheel, spoked wheel and identifying member hub end containing a hole therein, and further including a connecting pin insertable through each of said holes when properly aligned to allow the various elements to rotate around said connecting pin.

8. The comparison apparatus of claim 1 wherein the two plurality of spoked members comprise seven spoke members in combination with said positioning spoke member, said spoke members and positioning spoke member being angularly spaced apart from one another such that said first spoke member is angularly displaced 60 degrees from said positioning spoke member, said second spoke member is positioned 30 degrees from said first spoke member, said third spoke member is positioned 30 degrees from said second spoke member, said fourth spoke member is positioned 60 degrees from said third spoke member, said fifth spoke member is positioned 60 degrees from said fourth spoke member, said sixth spoke member is positioned 30 degrees from said fifth spoke member and said seventh spoke member is positioned 30 degrees from said sixth spoke member, each of said spoke members being positioned angularly removed from said positioning spoke member in the order of sequence of the numerical designations of spoke members, and wherein said first plurality of spoke members includes said first, third, fifth and seventh spoke members.

* * * * *